(12) United States Patent
Mizuno et al.

(10) Patent No.: US 7,298,603 B2
(45) Date of Patent: Nov. 20, 2007

(54) MULTILAYER CERAMIC CAPACITOR AND MANUFACTURING METHOD OF THE SAME

(75) Inventors: Youichi Mizuno, Gunma (JP); Jun Nishikawa, Gunma (JP); Chie Kawamura, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 11/493,093

(22) Filed: Jul. 25, 2006

(65) Prior Publication Data

US 2007/0025055 A1    Feb. 1, 2007

(30) Foreign Application Priority Data

Jul. 26, 2005    (JP)    ............... 2005-215860

(51) Int. Cl.
*H01G 4/005* (2006.01)
*H01G 4/06* (2006.01)

(52) U.S. Cl. .............. 361/303; 361/311; 29/25.42

(58) Field of Classification Search ........ 361/303–305, 361/311; 29/25.42
See application file for complete search history.

(56) References Cited

U.S. PATENT DOCUMENTS 4,477,858 A * 10/1984 Steiner .................. 361/273
6,661,640 B2 * 12/2003 Togashi .................. 361/306.3
6,768,630 B2 * 7/2004 Togashi .................. 361/306.1
6,912,115 B2 * 6/2005 Kobayashi et al. ...... 361/306.3
2006/0285271 A1 * 12/2006 Lee et al. ................. 361/303

FOREIGN PATENT DOCUMENTS

JP     8-124785     5/1996
JP     2003-22930   1/2003

* cited by examiner

*Primary Examiner*—Eric Thomas
(74) *Attorney, Agent, or Firm*—Knobbe Martens Olson & Bear LLP

(57) ABSTRACT

In one inventive aspect, a multilayer ceramic capacitor is provided, in which occurrence of cracks can be prevented even when temperature of the capacitor itself is increased. Non-flat portions are formed in both sides in a width direction of each of inner electrode layers. In addition, the non-flat portions comprise regions substantially changed into oxide regions, therefore a thermal expansion coefficient of the non-flat portions can be decreased so that stress due to difference in thermal expansion coefficient to non-flat portions can be reduced, and the stress can be dispersed in accordance with curvature or inclination of the non-flat portions. That is, stress generated when temperature of the capacitor itself is increased is decreased and dispersed, thereby occurrence of cracks due to the stress can be prevented in side margins of the ceramic chip.

14 Claims, 3 Drawing Sheets

[ FIG. 1 ]
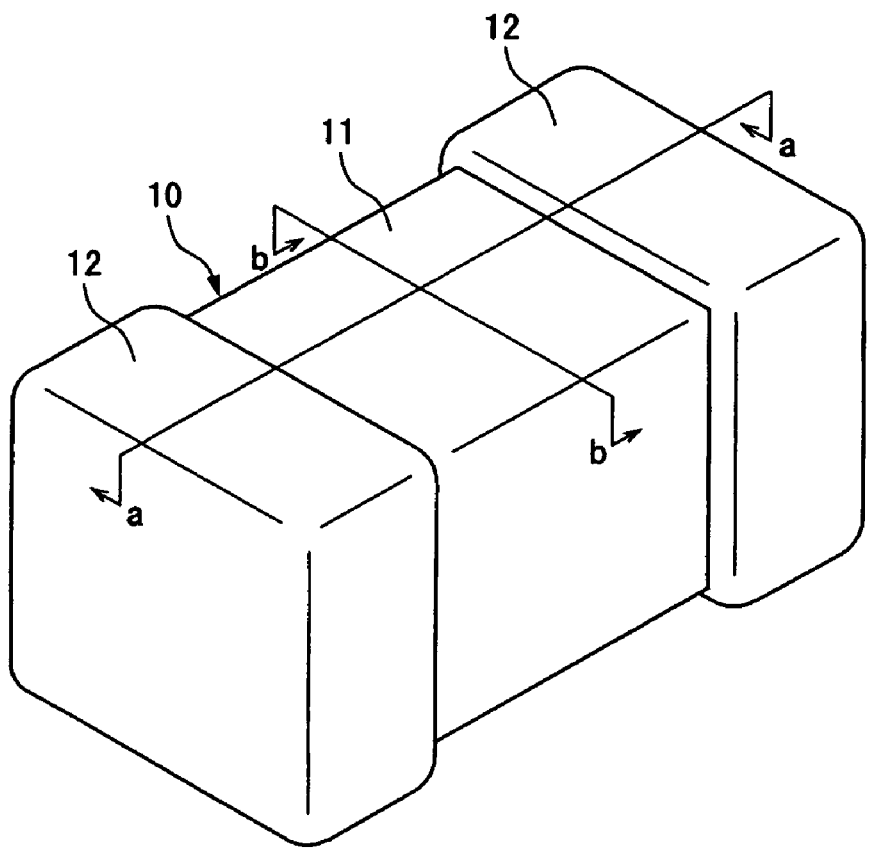
[ FIG. 2 ]
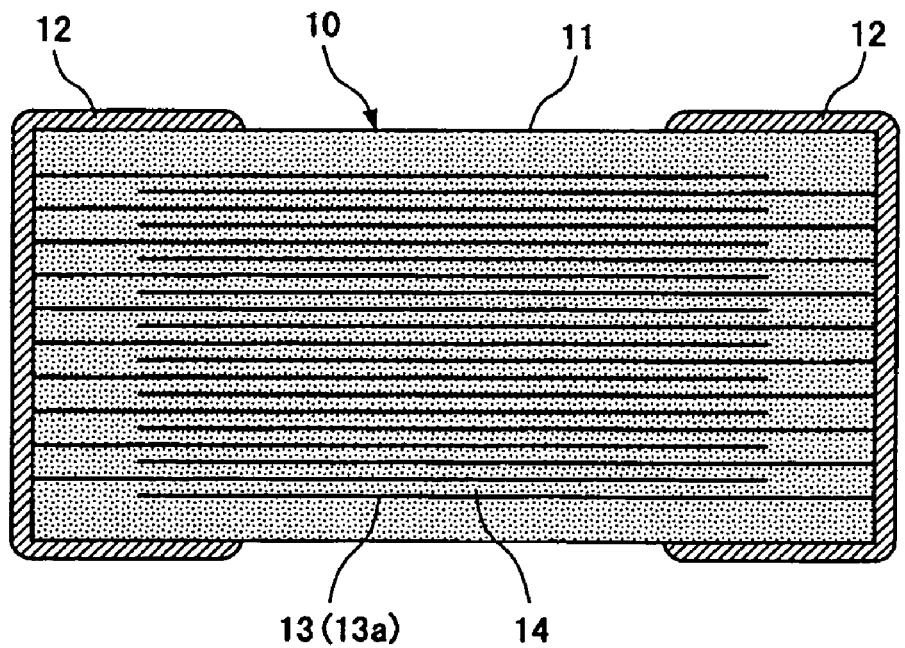

[ FIG. 3 ]
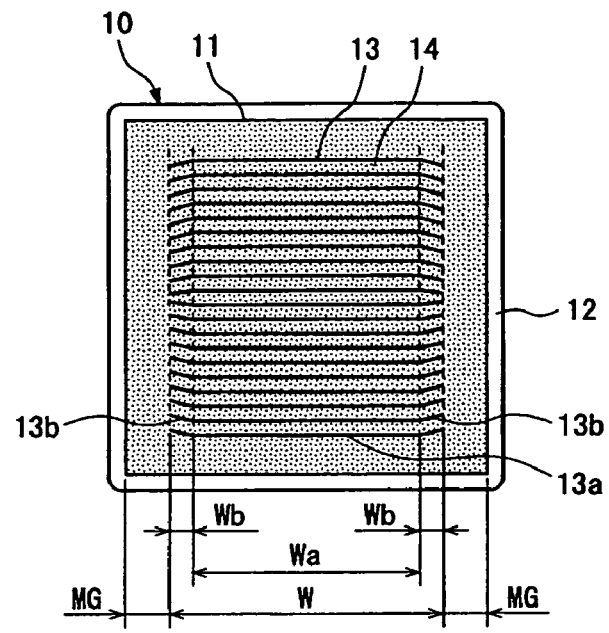
[ FIG. 4 ]
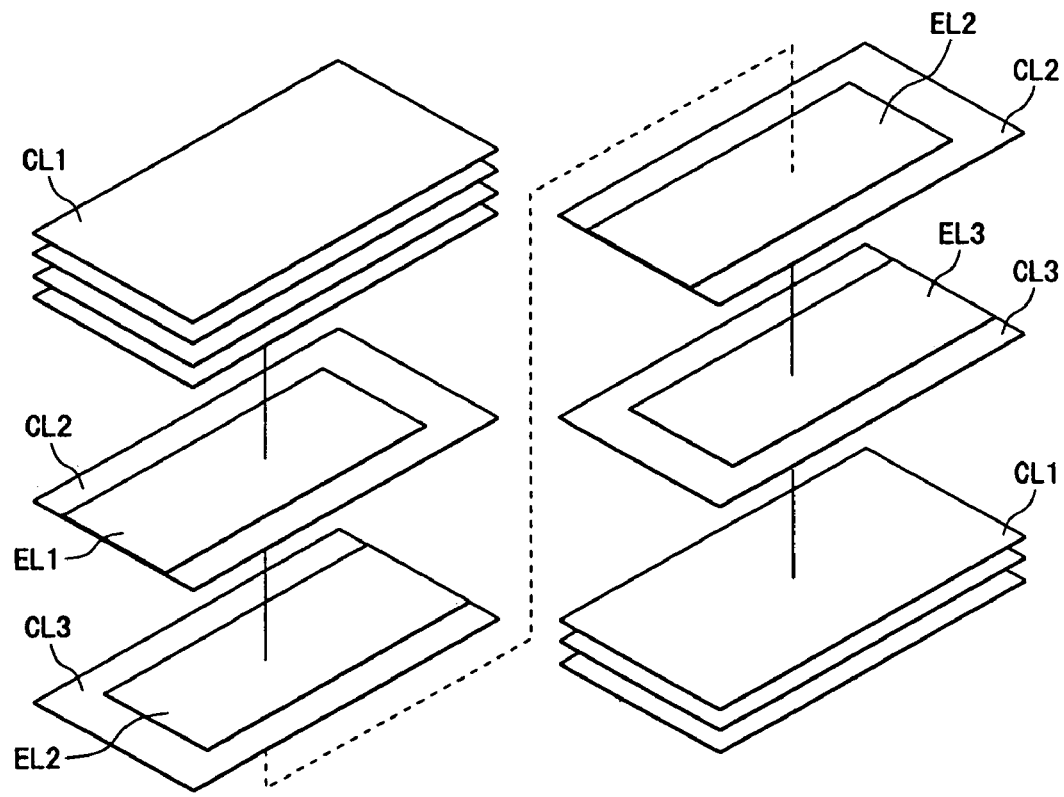

【FIG.5】
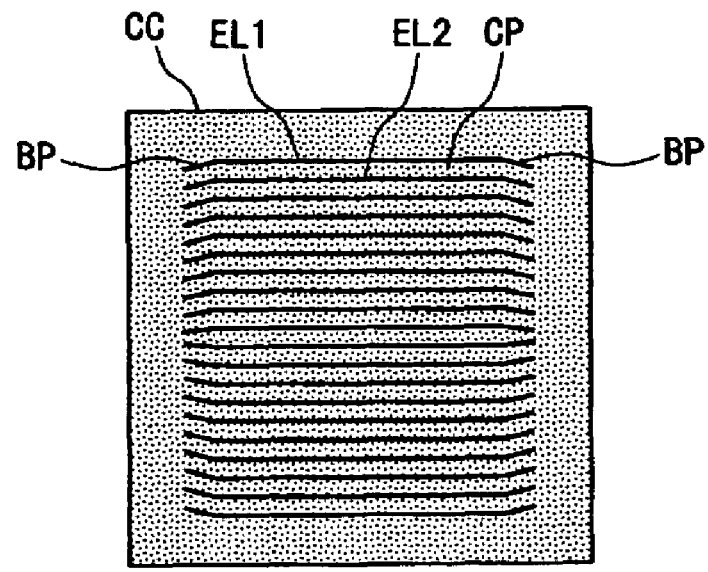
【FIG.6】
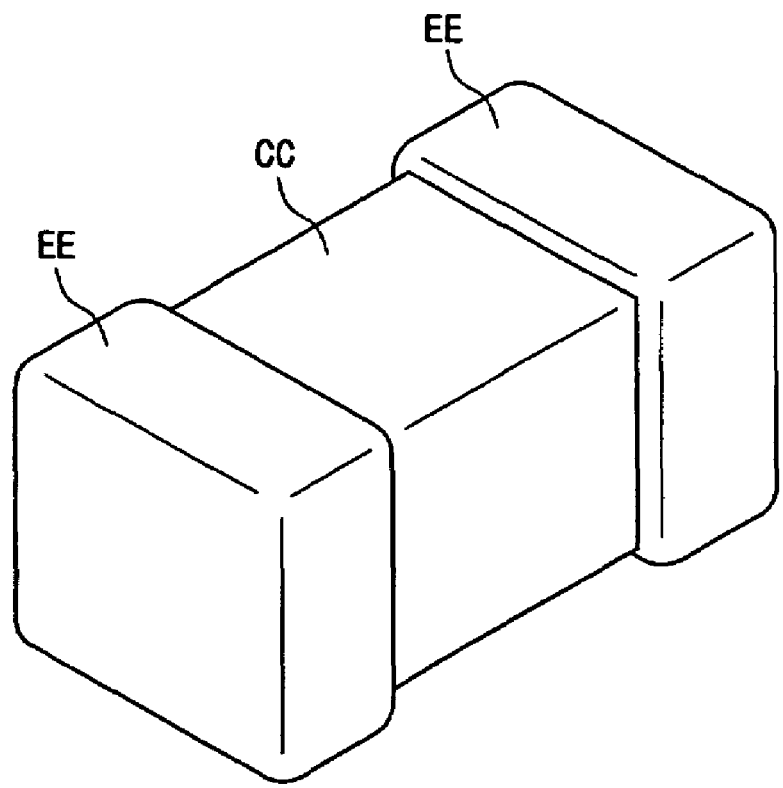

MULTILAYER CERAMIC CAPACITOR AND MANUFACTURING METHOD OF THE SAME

BACKGROUND OF THE INVENTION

1. Field of the Invention

The present invention relates to a multilayer ceramic capacitor, and a method of manufacturing the multilayer ceramic capacitor.

2. Description of the Related Technology

The multilayer ceramic capacitor has a ceramic chip in a rectangular prism shape having a structure where a plurality of inner electrode layers are stacked via ceramic portions, and an edge of each of the inner electrode layers is alternately exposed on either end face in a length direction, and a pair of outer electrodes formed at both ends in the length direction of the ceramic chip. The ceramic portions include a dielectric such as $BaTiO_3$, and the inner electrode layers and the outer electrodes includes a metal such as Ni.

The multilayer ceramic capacitor is manufactured through a step of stacking and pressing non-baked ceramic layers having non-baked inner electrode layers formed therein to obtain a non-baked ceramic chip, a step of forming non-baked outer electrodes at both ends in a length direction of the non-baked ceramic chip, and a step of baking the non-baked ceramic chip having the non-baked outer electrodes formed therein. When the metal configuring the inner electrode layers is a base metal, a step of reoxidation of the ceramic chip after baking is performed for controlling characteristics as necessary.

Certain background information may be found in Japanese Patent Documents JP-A-8-124785 and JP-A-2003-22930, each of which is incorporated by reference in it entirety.

The multilayer ceramic capacitor is generally mounted on various substrates by soldering, and when temperature of the capacitor itself is increased in soldering or voltage application after mounting, cracks may occur in the ceramic chip. The cracks occur mainly due to a fact that a thermal expansion coefficient of the inner electrode layers is higher than that of ceramic portions, that is, inner electrodes being thermally expanded cause stress mainly in side margin portions of the ceramic chip, and the stress causes occurrence of the cracks in the margin portions. Since the cracks in the ceramic chip may be a factor of significant change in capacitor characteristics, a measure is necessary, the measure being for preventing the cracks in the ceramic chip even when temperature of the capacitor itself is increased.

A capacitor in size 0603 (a reference value in a length direction is 0.6 mm and reference values in width and height directions are 0.3 mm) or size 0402 (a reference value in a length direction is 0.4 mm and reference values in width and height directions are 0.2 mm) is put into practical use with recent requirement of increase in capacity and size reduction, and the occurrence of cracks tends to be more significant with reduction in size of the multilayer ceramic capacitor, therefore the measure for preventing the cracks is now an extremely important technical development subject.

It is desirable to provide a multilayer ceramic capacitor in which occurrence of cracks in a ceramic chip can be prevented even when temperature of the capacitor itself is increased, and a method of manufacturing a multilayer ceramic capacitor by which the multilayer ceramic capacitor can be preferably manufactured.

SUMMARY OF CERTAIN INVENTIVE ASPECTS

A multilayer ceramic capacitor according to one inventive aspect has a ceramic chip in a shape of a rectangular prism having a structure where a plurality of inner electrode layers are stacked via ceramic portions, wherein the plurality of inner electrode layers are in a rectangular shape having predetermined width, length and thickness, and at least part of the plurality of inner electrode layers have flat portions in centers in a width direction and non-flat portions at both sides in the width direction, and the non-flat portions comprise substantially oxidized regions.

According to the multilayer ceramic capacitor, the non-flat portions are formed in both sides in the width direction of the inner electrode layers, in addition, the non-flat portions comprise substantially oxidized regions, therefore a thermal expansion coefficient of the non-flat portions can be decreased so that stress due to difference in thermal expansion coefficient to the non-flat portions can be reduced, and the stress can be dispersed in accordance with curvature or inclination of the non-flat portions. That is, stress generated when temperature of the capacitor itself is increased is decreased and dispersed, thereby occurrence of cracks due to the stress can be prevented in the side margins of the ceramic chip.

A method of manufacturing a multilayer ceramic capacitor according to one inventive aspect, has a step of stacking and pressing a plurality of non-baked ceramic layers having non-baked inner electrode layers formed therein such that at least part of the plurality of non-baked inner electrode layers are made to be non-flat at both sides in a width direction, so that a non-baked ceramic chip is obtained; and a step of baking the non-baked ceramic chip in a condition that a substantially oxidized region is formed in the non-flat portions at both the sides in the width direction of at least the part of the plurality of non-baked inner electrode layers, so that the ceramic chip is obtained.

According to the method of manufacturing the multilayer ceramic capacitor, the multilayer ceramic capacitor can be manufactured preferably and precisely.

According to one inventive aspect, a multilayer ceramic capacitor having a ceramic chip in which cracks do not occur even when temperature of the capacitor itself is increased, and a method of preferably manufacturing the multilayer ceramic capacitor can be provided.

Configurations, operations and effects of the embodiment of certain inventive aspects will be made clear according to the following description and attached drawings.

BRIEF DESCRIPTION OF THE DRAWINGS

FIG. 1 is a perspective view of a multilayer ceramic capacitor;

FIG. 2 is a cross section view along a line a-a of FIG. 1;

FIG. 3 is a cross section view along a line b-b of FIG. 1;

FIG. 4 is a view showing an example of a method of manufacturing the multilayer ceramic capacitor shown in FIGS. 1 to 3;

FIG. 5 is a view showing the example of the method of manufacturing the tacked ceramic capacitor shown in FIGS. 1 to 3; and FIG. 6 is a view showing the example of the method of manufacturing the tacked ceramic capacitor shown in FIGS. 1 to 3.

DETAILED DESCRIPTION OF CERTAIN ILLUSTRATIVE EMBODIMENTS

FIG. 1 is a perspective view of a multilayer ceramic capacitor, FIG. 2 is a cross section view along a line a-a of FIG. 1, and FIG. 3 is a cross section view along a line b-b of FIG. 1.

The multilayer ceramic capacitor 10 has a ceramic chip 11 in a shape of a rectangular prism having a predetermined length, width, and height, and a pair of outer electrodes 12 provided at both ends in a length direction of the ceramic chip 11.

The ceramic chip 11 has a structure in which a plurality of inner electrode layers 13 including a base metal such as Ni, Cu or Sn are stacked via ceramic portions 14 including a dielectric such as $BaTiO_3$. An edge of each of the inner electrode layers 13 is exposed alternately on either end face in a length direction of the ceramic chip 11. Each of outer electrodes 12 includes a base metal such as Ni, Cu or Sn, and is conducted to each of the exposed edges of the inner electrode layers 13.

The plurality of inner electrode layers 13 are formed in a rectangular shape having predetermined width, length and thickness, and as known from FIG. 3, each inner electrode layer 13 has a flat portion 13a in the center in a width direction and non-flat portions 13b in both sides in the width direction. While curved portions (portions bent in an arcuate form) are shown as the non-flat portions 13b in FIG. 3, the non-flat portions 13b may be inclined portions with respect to the flat portion 13a (slant portions by being inclined), or mixed portions of curved and inclined portions. Moreover, while FIG. 3 shows a chip where the non-flat portions 13b are directed to the center in a height direction of the ceramic chip 11, the portions 13b may be directed to a lower side in the height direction of the ceramic chip 11, or directed to an upper side in the direction of the ceramic chip 11, or may be randomly directed.

Moreover, the non-flat portion 13b of each inner electrode layer 13 includes a region substantially changed into an oxide region. In other words, the non-flat portion 13b of each inner electrode layer 13 as a whole is substantially changed into the oxide region, or part of the portion 13b is substantially changed into the oxide region. That is, capacitance of the multilayer ceramic capacitor 10 is mainly determined by the flat portions 13a of the plurality of inner electrode layers 13.

In FIG. 3, W indicates total lateral size of the inner electrode layer 13, Wa indicates lateral size of the flat portion 13a, Wb indicates lateral size of the non-flat portion 13b, and MG indicates a space of a side margin portion of the ceramic chip 11 (space between a side edge of the non-flat portion 13b and a side face of the ceramic chip 11 facing the side edge).

Again in the multilayer ceramic capacitor 10, when temperature of the capacitor itself is increased in soldering or voltage application after mounting, thermal expansion occurs in each of the inner electrode layers 13 and each of the ceramic portions 14, however, the non-flat portions 13b are provided at both the sides in the width direction of each inner electrode layer 13, in addition, the non-flat portions 13b include a region substantially changed into the oxide region, therefore the thermal expansion coefficient of the non-flat portions 13b is reduced so that stress due to difference in thermal expansion coefficient to the ceramic portions 14 can be reduced, and the stress can be dispersed in accordance with curvature and inclination of the non-flat portions 13b. That is, the stress generated when temperature of the capacitor itself is increased is reduced and dispersed, thereby occurrence of cracks due to the stress can be prevented in the side margin portions and the like of the ceramic chip 11.

To more effectively reduce the stress generated in the side margin portions of the ceramic chip 11, the lateral size Wb of the non-flat portion 14a can be within a range of 0.1 to 10% of the total lateral size W of the inner electrode layers 13, and preferably within a range of 1 to 5%. When the lateral size is less than 0.1%, the effect of preventing the occurrence of cracks is hardly obtained, and when it exceeds 10%, capacitance is significantly decreased. Moreover, the space MG of the side margin portion of the ceramic chip 11 is made within a range of 1 to 20% of the lateral size (W+2MG) of the ceramic chip, and preferably within a range of 2 to 15%. When it is less than 1%, oxidation may proceed to the flat portion 13a of the inner electrode layer 13, and when it exceeds 20%, the non-flat portions 13b tend to be insufficiently changed into oxidized regions.

FIGS. 4 to 6 show an example of a method of manufacturing the multilayer ceramic capacitor 10.

First, non-baked ceramic layers CL1 to CL3 as shown in FIG. 4 are stacked and subjected to thermal compression bond in an order as shown in the figure to obtain a non-baked ceramic chip CC (see FIG. 5).

The non-baked ceramic layer CL1 includes a green sheet formed by coating slurry containing dielectric powder of $BaTiO_3$ and the like, organic binder and organic solvent on a film and then drying it. The non-baked ceramic layers CL2 and CL3 are prepared by forming non-baked inner electrode layers EL1 and EL2 by printing conductive paste in a rectangular pattern having predetermined width, length and thickness on a surface of a green sheet similar to that of the non-baked ceramic layer CL1, the paste containing powder of a base metal of Ni, Cu or Sn, organic binder and organic solvent, and then drying it.

While FIG. 4 shows the non-baked ceramic layers CL1 to CL3 having a size corresponding to a single component, actually, the non-baked ceramic layers have a size corresponding to multi components taken at a time, and the non-baked inner electrode layers are formed multiply in predetermined arrangement. The non-baked ceramic chip CC is prepared by dividing a stacked body, which was obtained by stacking the non-baked ceramic layers and performing thermal compression bond to the layers, into a unit size.

As shown in FIG. 5, the non-baked ceramic chip CC has a structure where a plurality of the non-baked inner electrode layers EL1 and EL2 are stacked via non-baked ceramic portions CP, and non-flat portions BP are formed at both sides in a width direction of each of the non-baked inner electrode layers EL1 and EL2.

Levels of curvature and inclination of the non-flat portions BP can be controlled by controlling thickness of the non-baked inner electrode layers. That is, when the thickness of the non-baked inner electrode layers is increased, a vertical deformation level of the side margin portions of the non-baked ceramic layers is increased during stacking and pressing to be able to increase the levels of curvature and inclination of the portions at both the sides in the width direction of the non-baked inner electrode layers associated with the vertical deformation.

Next, as shown in FIG. 6, conductive paste like the above is coated on both ends in a length direction of the non-baked ceramic chip CC using a method such as dipping method and then dried it to form non-baked outer electrodes EE.

Next, the non-baked ceramic chip CC after the non-baked outer electrodes EE have been formed is baked at a condition of forming a region where the non-flat portions BP at both the sides in the width direction of each of the non-baked inner electrode layers EL1 and EL2 are substantially changed into oxide regions, specifically, at an atmosphere having an oxygen partial pressure corresponding to the oxidation equilibrium oxygen partial pressure of a metal contained in the non-baked inner electrodes EL1 and EL2.

For example, when the metal contained in the non-baked inner electrode layers EL1, EL2 and the non-baked outer electrodes EE is Ni, a reducing atmosphere having an oxygen partial pressure ($=10^{-8}$ atm $\cong 10^{-3}$ Pa) corresponding to the equilibrium oxygen partial pressure of Ni—NiO is employed and baking is carried out in the atmosphere at about 1,200° C.

While the non-flat portions BP can be sufficiently changed into oxidized regions according to a baking process as above, a reoxidation may be performed after a baking step at an atmosphere (including air) having higher oxygen partial pressure than that in the baking atmosphere, thereby the non-flat portions BP can be accurately changed into the oxidized regions. Moreover, the non-flat portions BP can be acceleratingly changed into the oxidized regions by controlling heating rate or cooling rate in the baking step, or increasing oxygen partial pressure during cooling.

According to the manufacturing method, the multilayer ceramic capacitor 10 as shown in FIGS. 1 to 3 can be manufactured preferably and accurately.

While the capacitor in which the non-flat portions 13b are provided at both the sides in the width direction of all the inner electrode layers 13, in the case that the non-flat portions 13b are provided at both the sides in the width direction of part of the inner electrode layers 13, for example, in the case that the non-flat portions 13b are not present at both the sides in the width direction of several sheets of the inner electrode layers 13 of the plurality of inner electrode layers 13, presence of the non-flat portions 13b including the regions substantially changed into the oxide regions provides the operations similar to those in the above, so that occurrence of cracks can be prevented. In some embodiments, the non-flat portions are not present at both the sides in the width direction of one or more of the inner electrode layers.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A multilayer ceramic capacitor comprising:
    a ceramic chip in a shape of a rectangular prism, the ceramic chip comprising a plurality of inner electrode layers stacked via ceramic portions,
    wherein one or more of the plurality of inner electrode layers comprise flat portions in centers in a width direction and non-flat portions at both sides in the width direction, and wherein the non-flat portions comprise substantially oxidized regions.

2. The multilayer ceramic capacitor according to claim 1, wherein the lateral size of each of the non-flat portions is within a range of about 0.1% to 10% of the total lateral size of the respective inner electrode layer.

3. The multilayer ceramic capacitor according to claim 2, wherein the lateral size of each of the non-flat portions is within a range of about 1% to 5% of the total lateral size of the respective inner electrode layer.

4. The multilayer ceramic capacitor according to claim 1, wherein a space between each of the non-flat portions and a side face of the ceramic chip facing the side edge of the non-flat portion is within a range of approximately 1% to 20% of lateral size of the ceramic chip.

5. The multilayer ceramic capacitor according to claim 1, wherein each non-flat portion comprises a curved or inclined portion.

6. The multilayer ceramic capacitor according to claim 1, wherein capacitance of the multilayer ceramic capacitor depends mainly on the flat portions of the plurality of the inner electrode layers.

7. The multilayer ceramic capacitor according to claim 1, wherein the thermal expansion coefficients of the non-flat portions is substantially lower than the flat portions.

8. A method of manufacturing a multilayer ceramic capacitor comprising a ceramic chip in a shape of a rectangular prism, the ceramic chip comprising a plurality of inner electrode layers stacked via ceramic portions, the method comprising:
    stacking and pressing a plurality of non-baked ceramic layers each comprising non-baked inner electrode layers such that at least one of the plurality of non-baked inner electrode layers comprise non-flat portions at both sides in a width direction; and
    baking the layers in a condition such that one or more regions of each non-flat portion is substantially oxidized.

9. The method according to claim 8, wherein the layers are baked in a baking atmosphere of an oxygen partial pressure corresponding to the oxidation equilibrium oxygen partial pressure of a metal comprised in the non-baked inner electrode layers.

10. The method according to claim 8, further comprising re-oxidizing the ceramic chip in an atmosphere of higher oxygen partial pressure than the baking atmosphere.

11. The method according to claim 8, wherein the lateral size of each of the non-flat portions is within a range of about 0.1% to 10% of the total lateral size of the respective inner electrode layer.

12. The method according to claim 8, wherein the lateral size of each of the non-flat portions is within a range of about 1% to 5% of the total lateral size of the respective inner electrode layer.

13. The method according to claim 8, wherein a space between each of the non-flat portions and a side face of the ceramic chip facing the side edge of the non-flat portion is within a range of approximately 1% to 20% of lateral size of the ceramic chip.

14. The method according to claim 8, wherein each non-flat portion comprises a curved or inclined portion.

* * * * *